(12) United States Patent
Bretschneider et al.

(10) Patent No.: US 12,549,339 B2
(45) Date of Patent: Feb. 10, 2026

(54) ENCRYPTION OF PROGRAM INSTRUCTIONS IN A NUMERICAL CONTROL DEVICE

(71) Applicant: Siemens Aktiengesellschaft, Munich (DE)

(72) Inventors: Jochen Bretschneider, Owingen (DE); Lars Immenroth, Zwickau (DE); André Vieweg, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 18/696,783

(22) PCT Filed: Aug. 5, 2022

(86) PCT No.: PCT/EP2022/072102
§ 371 (c)(1),
(2) Date: Mar. 28, 2024

(87) PCT Pub. No.: WO2023/051980
PCT Pub. Date: Apr. 6, 2023

(65) Prior Publication Data
US 2024/0413983 A1 Dec. 12, 2024

(30) Foreign Application Priority Data
Sep. 30, 2021 (EP) ..................... 21200100

(51) Int. Cl.
*H04L 9/08* (2006.01)
(52) U.S. Cl.
CPC .................. *H04L 9/0841* (2013.01)
(58) Field of Classification Search
CPC .................................... H04L 9/0841
See application file for complete search history.

(56) References Cited

U.S. PATENT DOCUMENTS 7,797,552 B2 * 9/2010 Kahn ............... H04N 21/26613
713/193
9,608,822 B2 * 3/2017 Lochmatter ........... H04L 9/3236
(Continued)

FOREIGN PATENT DOCUMENTS

DE 10 2018 214 840 A1 3/2020
EP 2 620 826 A1 7/2013
(Continued)

OTHER PUBLICATIONS

PCT International Search Report and Written Opinion of International Searching Authority mailed Nov. 28, 2022 corresponding to PCT International Application No. PCT/EP2022/072102 filed Aug. 5, 2022.

(Continued)

*Primary Examiner* — Iral S Lakhia
(74) *Attorney, Agent, or Firm* — Henry M. Feiereisen LLC

(57) ABSTRACT

In a method for operating a numerical control device for controlling a production machine for producing a workpiece, program instructions generated by CAM software are encrypted with a first encryption key to generate first encrypted program instructions and the first encrypted program instructions are decrypted with a first decryption key to generate first decrypted program instructions. To prevent unauthorized access to the program instructions, the first decrypted program instructions are re-encrypted using a second encryption key to generate second encrypted program instructions, which are stored in a memory of the numerical control device. Subsequently, the second encrypted program instructions are read out of the memory and decrypted record-by-record or block-by-block, such that only those program instructions of the part program which are currently being processed by the numerical control (Continued)

device, or whose processing is imminent and used to control the production machine for the production of the workpiece.

16 Claims, 3 Drawing Sheets

(56) References Cited

U.S. PATENT DOCUMENTS

| | | | | |
|---|---|---|---|---|
| 10,013,579 | B2* | 7/2018 | Elbaz | H04L 9/0877 |
| 10,645,066 | B2* | 5/2020 | Swahn | H04L 9/0656 |
| 10,735,193 | B1* | 8/2020 | Knas | H04L 9/3239 |
| 10,782,959 | B1* | 9/2020 | Schambureck | G06F 8/71 |
| 11,201,725 | B2* | 12/2021 | Georgieva | H04L 9/008 |
| 11,838,787 | B2* | 12/2023 | Lo | H04L 41/145 |
| 11,893,846 | B2* | 2/2024 | Ruffkess | G07C 9/00857 |
| 11,949,773 | B2* | 4/2024 | Goel | G06F 21/6209 |
| 2002/0199110 | A1 | 12/2002 | Kean | |
| 2017/0085543 | A1* | 3/2017 | Choi | H04L 9/0841 |
| 2017/0343997 | A1 | 11/2017 | Fan et al. | |
| 2021/0312063 | A1 | 10/2021 | Laing et al. | |
| 2021/0349442 | A1 | 11/2021 | Tarnofsky et al. | |
| 2022/0045994 | A1* | 2/2022 | Masny | H04L 9/3242 |

FOREIGN PATENT DOCUMENTS

| | | |
|---|---|---|
| EP | 4 105 745 A1 | 12/2022 |
| WO | WO 2016/086344 A1 | 6/2016 |
| WO | WO 2020/086088 A1 | 4/2020 |

OTHER PUBLICATIONS

Wikipedia, Elliptic-curve Diffie-Hellman, https://en.wikipedia.org/wiki/Elliptic-curve_Diffie%E2%80%93Hellman, gefunden am Oct. 1, 2021, 13:47, pp. 2; 2021.

* cited by examiner

ENCRYPTION OF PROGRAM INSTRUCTIONS IN A NUMERICAL CONTROL DEVICE

CROSS-REFERENCES TO RELATED APPLICATIONS

This application is the U.S. National Stage of International Application No. PCT/EP2022/072102, filed Aug. 5, 2022, which designated the United States and has been published as International Publication No. WO 2023/051980 A1 and which claims the priority of European Patent Application, Serial No. 21200100.2, filed Sep. 30, 2021, pursuant to 35 U.S.C. 119 (a)-(d).

BACKGROUND OF THE INVENTION

The invention relates to a method for operating a numerical control device for controlling a production machine for producing a workpiece, having the following steps:
  providing workpiece data,
  providing CAM software,
  generating program instructions for the production of the workpiece by means of the production machine, the program instructions being generated in accordance with the workpiece data by means of the CAM software or by means of post-processor software downstream of the CAM software,
  encrypting the program instructions using a first encryption key in order to generate first encrypted program instructions,
  decrypting the first encrypted program instructions by way of the numerical control device using a first decryption key in order to generate first decrypted program instructions.

The invention further relates to a numerical control device for performing the method.

The invention further relates to a production machine system, comprising a numerical control device for performing the method and a production machine which is connected to the numerical control device.

The manufacturing process of a workpiece that is to be produced usually starts with the modeling of the workpiece on a CAD system (Computer Aided Design). The geometry data which is specified in this way with the aid of the CAD . . . system, and relates to the workpiece that is to be produced, is forwarded as input variables to a CAM system (Computer Aided Manufacturing). With the aid of the CAM system, the geometry data relating to the workpiece that is to be produced and the subsequent configuration of the production machine, and if applicable the geometry data relating to a blank which subsequently forms the unmachined part for the production process on the production machine, are used to determine the paths for a tool, along which the tool moves relative to the workpiece during the manufacturing process. For example, in the case of milling work, the milling paths are determined which must be followed by a milling machine in order to manufacture the workpiece that is to be produced from the blank.

In this way, the movements of one or more tools that are required for the manufacture of the workpiece are specified by the CAM system and provided as input variables to a so-called post-processor.

In the context of the invention, possible production methods are not limited to methods which remove material (milling, turning, drilling, grinding, etc.), but also comprise production methods which add material (3D printing, welding, etc.).

The wide diversity of production methods is matched by the diversity of production machines that are used for this purpose. The production can therefore involve fabrication machinery, machine tools, 3D printing machines, robots, etc.

The post-processor, which is usually present in the form of a program which runs on a computer, generates the control program for this specific production machine from the movement paths determined by the CAM system and the configuration of the specific production machine to be used for the production.

When a production machine takes the form of a machine tool, the numerical control device is usually referred to as a CNC control (Computerized Numerical Control) or numerical control, and the control program as a part program, NC part program or NC program.

Using the CNC control in conjunction with the corresponding part program, the desired workpiece is produced on the respective machine tool from the blank. In order to achieve this, the CNC control converts the movement paths that are stored in the part program into interpolated movements of the individual machine axles so that the tool is moved in the desired manner relative to the workpiece.

The control program or part program is normally present in the form of a file containing program instructions (commands) which are written in DIN code, in particular the so-called G-Code, and are stored as sequential lines of ASCII code. Such a command (e.g. G3 X115 Y113.3 I-43 J25.52), also referred to as a record, can consist in e.g. moving a tool, e.g. a milling cutter, along a section of a circular path to a destination position in order to mill out e.g. a recess in the blank. The individual commands of the part program are subsequently read in by the numerical control device of the machine tool. Corresponding to the commands of the part program, the numerical control device calculates positional reference values $X_{reference\_n}$ for each drive n of the drive system of the machine tool and allocates said reference values to the drives accordingly. A closed-loop control device which is likewise comprised in the numerical control device ensures that the determined positional reference values $X_{reference\_n}$ of the individual drives (axles) are also set accordingly.

The procedure described above and the components required for this purpose are disclosed in EP 2058717 A1, for example.

There is a trend to transfer complex production tasks which could previously only be achieved using autonomous (external) CAD/CAM tools into the CNC control for a machine tool. The CAD/CAM system is therefore integrated into the CNC control or included in the CNC control. The CAD/CAM software then generates the part program for controlling the respective machine tool directly on the CNC control which is connected to the machine tool, and on which it will subsequently be processed.

For example, WO 2016086344 A1 discloses that the CAD data can be input directly into the CNC control, and CAM software which is available on the CNC control can generate a part program directly on this CNC control.

EP 2620826 A1 further discloses that a part program can be transferred in encrypted form between an external CAM system and a CNC control in order to protect against unauthorized access.

The applicant's patent application having the official application file number EP 21179270.0 indicates a method for operating a numerical control device in order to control a production machine for producing a workpiece, said method having steps as follows:
  providing workpiece data on the numerical control device,
  providing CAM software on the numerical control device,
  generating program instructions for the production of the workpiece by means of the production machine, said program instructions being generated by means of the CAM software in accordance with the workpiece data,
  encrypting the program instructions and storing the encrypted program instructions in a non-volatile memory of the numerical control device,
  reading out the encrypted program instructions from the non-volatile memory, decrypting the encrypted program instructions and processing the decrypted program instructions by way of the numerical control device in order to control the production machine for producing the workpiece.

From the perspective of the numerical control device manufacturer (also referred to below as the "control manufacturer"), the last cited method has the disadvantage of possibly representing a security risk to the manufacturer.

For example, if an OEM manufacturer (Original Equipment Manufacturer) wants to install CAM software on the numerical control device and use this to generate program instructions for a specific part that has to be produced, and wants to protect said program instructions against unauthorized access by means of encryption, corresponding encryption and decryption software is required on the numerical control device. The encryption is particularly effective if the decryption takes place in an NCK (Numerical Control Kernel) of the numerical control device and the decrypted program instructions are only present for a short time in a volatile memory of the NCK. However, this requires the OEM to have recourse to decryption software of the control manufacturer or for the control manufacturer to permit decryption software of the OEM to be stored in the NCK and therefore in a highly sensitive region of the numerical control device.

US2002/0199110A1 discloses techniques for the protection of intellectual property on field-programmable gate arrays (FPGAs). One approach is to equip each field-programmable gate array or a limited number of field-programmable gate arrays with a secret key. Each field-programmable gate array can only be programmed by a suitable bit stream (which contains intellectual property). The bit stream is encrypted with a public key which is associated with a specific FPGA and can only be decrypted by this FPGA using a private key. Further techniques are also proposed in this document and include network-based, non-network-based, software-based, and layer-based encryption approaches. These techniques enable a supplier of intellectual property to invoice a customer per use or per configuration of the supplier's intellectual property. This is possible because an encrypted bit stream can only be used in a limited number of integrated circuits, and possibly only in one integrated circuit.

An object of the present invention is to protect program instructions that are generated by a user of a numerical control device for the numerical control device, in particular a part program for a CNC control, against unauthorized access without this resulting in a security risk to the control manufacturer.

SUMMARY OF THE INVENTION

This object is achieved by a method for operating a numerical control device for controlling a production machine for producing a workpiece, having the following steps:
  providing workpiece data,
  providing CAM software,
  generating program instructions for the production of the workpiece by means of the production machine, the program instructions being generated in accordance with the workpiece data by means of the CAM software or by means of post-processor software downstream of the CAM software,
  encrypting the program instructions using a first encryption key in order to generate first encrypted program instructions,
  decrypting the first encrypted program instructions by means of the numerical control device using a first decryption key in order to generate first decrypted program instructions,
  encrypting the decrypted program instructions using a second encryption key in order to generate second encrypted program instructions and storing the second encrypted program instructions in a memory of the numerical control device,
  reading out the second encrypted program instructions from the memory, decrypting the second encrypted program instructions in order to generate second decrypted program instructions and processing the second decrypted program instructions by way of the numerical control device in order to control the production machine for producing the workpiece.

The object cited above is further achieved by a numerical control device which executes a method as likewise cited above.

Furthermore, the object cited above is achieved by a production machine system comprising such a numerical control device and a production machine that is controlled thereby.

The invention has the advantage that the user of the numerical control device, e.g. an OEM, can use their software for encrypting and decrypting the programs that are generated by them while the control manufacturer does not need to install any software of the user in the NCK of the numerical control device for this purpose.

Instead, both the user and the manufacturer of the numerical control device use their own cryptography software for encrypting and decrypting data.

The interface between these two cryptography applications is advantageously provided by a crypto-coupler which is able to decrypt the encrypted data (program instructions) of the user and immediately thereafter to re-encrypt the data by means of the encryption software of the control manufacturer.

A crypto-coupler is generally understood to be a device which can be realized in both hardware and software, and converts the various encryption methods into each other. These various methods may differ in respect of the algorithm used, the format of the resulting encrypted files, or simply due to different keys.

A crypto-coupler can also be referred to as an adapter. An adapter can migrate information from one system to another system. One such example is a bus coupler which links various systems together. This idea is analogously transferred to a cryptographic application here.

The crypto-coupler is not necessarily dependent on converting a persistently stored encrypted program from one format into another format by using . . . cryptographic functions. A cryptographically protected data stream can also be sent to the crypto-coupler continuously. The crypto-coupler can decode or decrypt this data stream by decoding or decrypting only a small section of the data stream at a time. In the next step, the adapter re-encrypts this briefly unencrypted content into the second cryptographic format.

As mentioned above, various cryptographic methods can be used. It is also not essential to work with fixed key pairs as is customary in asymmetric cryptography. It is further possible for individual keys to be negotiated for each connection with the adapter, as is customary for secure connections in the field of networking. The respective keys are then only valid for a short time period or only for the cryptographic conversion of specific program instructions.

The program instructions generated by the CAM algorithm and possibly a downstream post-processor are advantageously encrypted by means of a first encryption key (of the user), and first encrypted program instructions are generated thereby. By way of the crypto-coupler, the first encrypted program instructions are decrypted again using a first decryption key, which can match the first encryption key, in order to generate first decrypted program instructions.

Preferably immediately following this decryption, the first decrypted program instructions are re-encrypted, specifically using the second encryption key, whereby second encrypted program instructions are produced.

The crypto-coupler is preferably organized in such a way that the decrypted program instructions are buffered if need be in a volatile memory assigned to the crypto-coupler, and at most only for a short time. In particular, decrypted program instructions—after they have been re-encrypted—are immediately overwritten by new decrypted program instructions after the encryption. This ensures that decrypted program instructions are never present in large numbers or for an extended period in a memory of the CNC control.

As a result of the different encryptions (at least different encryption keys, and possibly different encryption algorithms or methods), the first encrypted program instructions differ from the second encrypted program instructions. The same program instructions are still contained therein, but present or "hidden" in a form that is encrypted differently.

The crypto-coupler can be designed as a hardware module, e.g. in the form of an FPGA. However, the crypto-coupler is preferably designed as a software application which accesses the resources (processor, memory, etc.) of the numerical control device. In this way, the crypto-coupler is advantageously implemented outside the NCK. In particular, the crypto-coupler does not use any memory or memory areas that are assigned to the NCK.

In connection with the invention, it is in principle of no importance whether the generation, encryption and subsequent transfer in encrypted form of the program instructions onto the numerical control device takes place outside the numerical control device (by means of an external CAM system), or whether the program instructions are generated directly on the numerical control device by means of CAD/CAM software which is installed on the numerical control device, and then encrypted by the user. In both cases, program instructions which have been encrypted by the user and consequently protected against unauthorized access are ultimately available on the numerical control device.

As a result of transferring the CAM algorithm onto the numerical control device, the user can respond to changing conditions directly at the operating unit of the control device. Furthermore, the CAM algorithm has access to machine parameters of the production machine concerned, said parameters being stored in the numerical control device, and can therefore sometimes generate an optimized control program and hence a better production result. Since the control program is created for the production machine that is actually present, a post-processor is also not needed in this case.

In an embodiment variant of the invention, only one key is used by the user for the purpose of encrypting and decrypting the program instructions (symmetrical encryption). The first encryption key therefore matches the first decryption key. This has the advantage that only one key is required, this being nonetheless used by both the encryption entity and the decryption entity.

Alternatively, it is however also possible for the user to employ asymmetrical encryption with a key pair, usually a so-called public key and a so-called private key. The first encryption key and the first decryption key therefore differ. The encrypting entity does not know the key for the decryption in this case.

The same applies to the control manufacturer as to the user. Irrespective of the selection made by the user, the control manufacturer likewise can employ both symmetrical encryption for encryption and decryption, in which case the second encryption matches the second decryption key, and asymmetrical encryption, in which case the second encryption key and the second decryption key differ.

With regard to the cryptographic methods, both the user and the control manufacturer can therefore choose freely from all current methods (symmetrical/asymmetrical cryptography).

According to an embodiment variant of the invention, the program instructions form individual records or blocks of multiple records of a control program for the production of the workpiece.

During both the encryption and the decryption, it can be advantageous not to encrypt or decrypt the complete control program for the production of the workpiece in a single operation. This means that the CAM software generates the control program record-by-record or block-by-block, and it is therefore appropriate already to encrypt these records or blocks while they are being generated or at least immediately afterwards, such that neither the complete control program nor large parts thereof are present in unencrypted form at any time on the numerical control device.

This applies to the decryption of the control program likewise. Here again it is advantageous for the decryption to take place record-by-record or block-by-block, such that only those program instructions of the control program which are currently being processed by the numerical control device, or whose processing is imminent, are decrypted.

In the context of the cited procedure, when using block-by-block encryption and decryption, the blocks being encrypted need not correspond to the blocks being decrypted. It is therefore possible, for example, to select different sizes of the respective blocks for encryption and decryption. The size of the blocks (also referred to as block length) can therefore be adapted if necessary to different limiting conditions relating to the encryption or decryption. In particular, the block length for the decryption can also be adapted to limiting conditions of the numerical control device for the processing of these blocks.

When using the crypto-coupler in accordance with the invention, this means that the program instructions are decrypted and re-encrypted by the crypto-coupler in the form of a data stream. The processes for decryption and encryption can therefore be processed to a large extent simultaneously in the crypto-coupler and therefore a large amount of data, e.g. a complete control program or part program, is not present in unencrypted form at any time in a memory of the numerical control device.

The second encrypted program instructions are advantageously decrypted in an NC kernel of the numerical control device. The NC kernel, also referred to as NCK (Numerical Control Kernel), is that part of the numerical control device which controls the axles of the machine tool. Essential components of the NCK are: the interpreter, the interpolator, and the regulators for position, speed and acceleration of the individual drives (axles) of the machine tool. Concerning confidential data, the NCK is a region of the numerical control device which is highly sensitive and is therefore specially protected against external access. It is not normally possible for a user of the numerical control device to directly access a memory area of the NCK.

In an embodiment variant of the invention, the decryption of the second encrypted program instructions is restricted to a specific numerical control device and/or a specific production machine and/or to a specific license.

With regard to the practical implementation of the invention, it is advantageous to install a DRM library (Digital Rights Management), by means of which in particular the management of keys and permissions is organized, on the numerical control device and in particular in the software region of the NCK. It is thereby also easier to manage the access permissions and therefore easy in particular to implement identical or similar access permissions on a plurality of numerical control devices, e.g. within a factory. This means that various users having different permissions can be set up on the numerical control device. Not every user can or is allowed to execute the same actions, or to process or read the same files. Furthermore, execution permissions for encrypted program contents can be associated with a specific machine. In this regard, the encrypted contents can then only be executed on one machine or on a certain machine type. It is also possible to . . . restrict the number of executions. Following a number of calls, the encrypted program can no longer be processed.

It is also possible by means of the DRM library to make provision for authentication of a user to be first required before access to the numerical control device generally, or to protected contents located therein, is possible.

In particular, the actual cryptography software, e.g. "OpenSSL", can also be at least partly included in the DRM library.

The "Security and Access Rights" package is then easier to implement as an autonomous and integral data package for the control manufacturer.

In particular, the NC kernel only accesses, decrypts and processes the encrypted program instructions following a successful authentication, preferably using the DRM library.

The second decrypted program instructions, which are produced from the second encrypted program instructions following the decryption, are advantageously only stored in a volatile memory of the NCK, as a result of which they are overwritten by new program instructions and consequently deleted again immediately after being processed. It would therefore be at best extremely difficult to read out the unencrypted program instructions from the NCK of the numerical control device.

The second decrypted program instructions or the individual movement specifications derived therefrom are advantageously not stored in the file system of the control device and are also not visible by other means outside the NC kernel, being only available internally in the volatile memory of the NC kernel. The NC kernel (NCK) is additionally able to interpret the movement specifications and to perform . . . axle movements without functional restrictions in the same way as unencrypted control programs.

Non-encrypted control programs can nonetheless also continue to be processed.

According to an embodiment variant of the invention, the first encryption key and first decryption key are generated together on the basis of a Diffie-Hellman key exchange, e.g. using the ECDH (Elliptic-curve Diffie-Hellman) method (see e.g. https://en.wikipedia.org/wiki/Elliptic-curve_Diffie %E2%80%93Hellman). This has the advantage that a shared (symmetric) key can be agreed between the numerical control device and the external computing device, which key does not have to be transferred between these two partners and therefore cannot be "eavesdropped". Furthermore, the symmetric key can be different for each new data transfer between the partners (new part program, new program instructions), without the user having to provide the numerical control device or the external computing device with new keys each time for this purpose. This also has a speed advantage, which symmetrical encryption has over asymmetrical encryption.

BRIEF DESCRIPTION OF THE DRAWING

The invention is described and explained by way of example in greater detail below with reference to exemplary embodiments, in which.

DETAILED DESCRIPTION OF PREFERRED EMBODIMENTS

Figure 1:
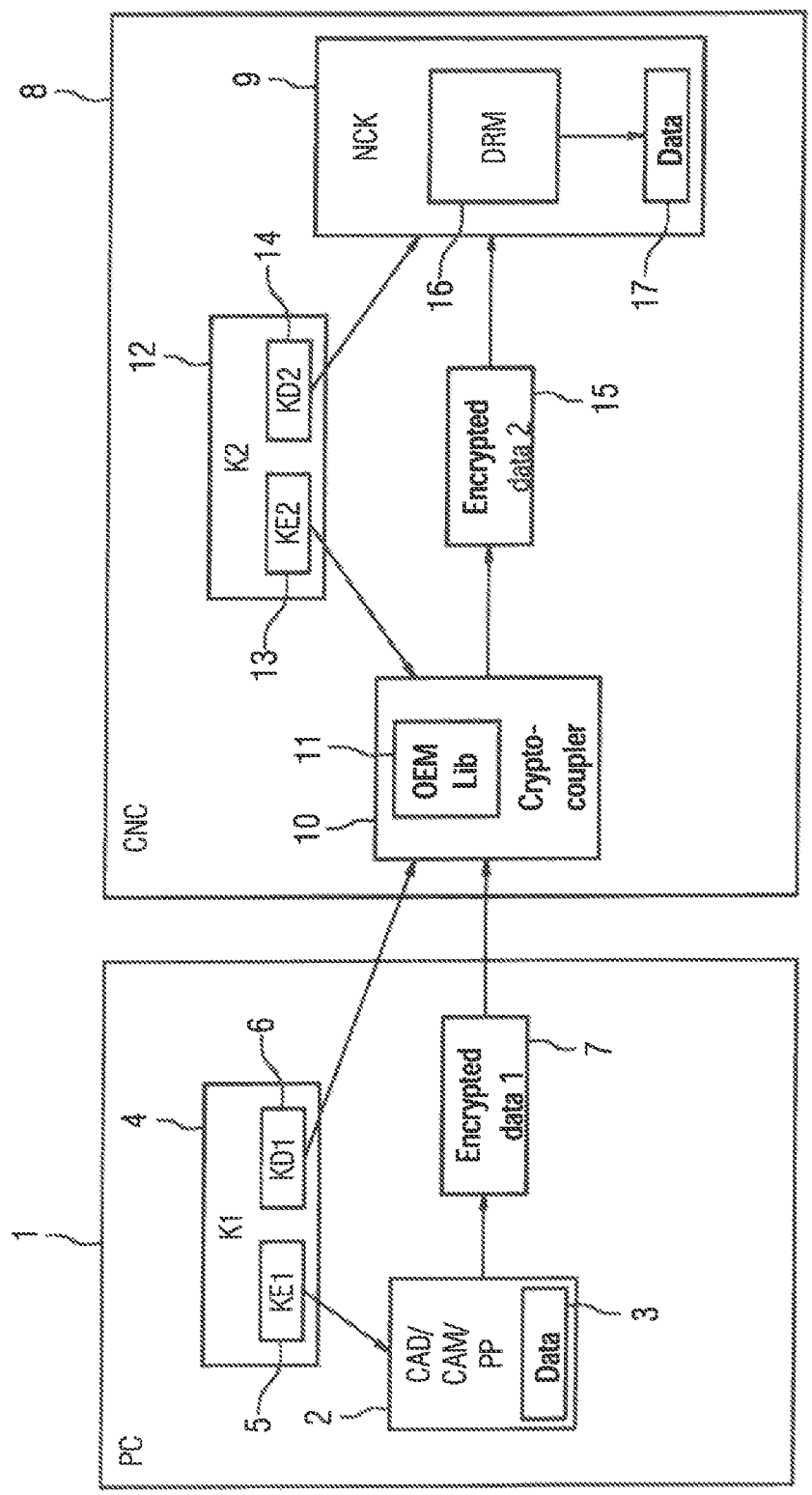
FIG. 1 shows a first embodiment variant of the invention.

FIG. 1 shows a first exemplary embodiment of the invention, in which program instructions, in particular records of a part program which together constitute a part program, are generated by means of an external computing device, e.g. a PC 1, which is located outside a numerical control device in the form of a CNC control 8.

The generation of such program instructions by means of a CAD/CAM PP system which has been configured for this purpose, and which may comprise a plurality of computers running a plurality of software applications but may also comprise just one individual computer running one or more software applications, is sufficiently well known from the prior art. The process can be summarized as follows:

The geometry data for a workpiece which must be produced is first defined by means of a CAD system, in particular a CAD application installed on a computer.

The CAD data thus generated is subsequently supplied to a CAM system, in particular a CAM application installed on a computer.

With the aid of the CAM system, the geometry data relating to the workpiece that is to be produced and possibly the geometry data relating to a blank are used to determine the paths for a tool, along which the tool moves relative to the workpiece during the manufacturing process of the workpiece.

The output data of the CAM system is subsequently supplied to a post-processor system (PP), in particular a post-processor application installed on a computer.

On the basis of the movement paths determined by the CAM system, the configuration of the actual production machine on which the production is to take place, and the CNC control that is actually used, the post-processor generates the control program (part program) for this actual production machine and the actual CNC control associated therewith.

As a result of executing the part program, and by means of program instructions contained therein, the workpiece that must be produced is manufactured step-by-step from the blank.

In the exemplary embodiment, the three cited software applications (Apps) CAD-App. CAM-App and PP-App are grouped into a combined software application 2 "CAD/CAM/PP" for clarity. However, these applications are usually present as separate applications, possibly even from different software providers. Again for clarity, these software applications all run on the PC 1 in the exemplary embodiment. The different software applications can equally run on different computers.

The final result of the CAD-CAM-PP process is the part program with the program instructions 3 "data" contained therein, which can be executed by an actual CNC control for an actual machine tool.

The complete part program and in particular the program instructions 3 contained therein are usually considered by the creator of this data to be confidential and worthy of protection against unauthorized access. Therefore the PC 1 in accordance with the exemplary embodiment contains encryption software 4 with a key K1, in particular a "public key" KE1 for the encryption (encrypt) and a "private key" KD1 for the decryption (decrypt) of the data. The encryption software in the exemplary embodiment therefore performs an asymmetrical encryption, in which different keys are used for the encryption and the decryption. The first encryption key 5 (KE1) therefore differs from the first decryption key 6 (KD1).

In the exemplary embodiment, the data 3 that is generated by the user of the PC 1 is encrypted by means of the encryption software 4 using the encryption key 5 (KE1), resulting in the first encrypted program instructions (data) 7 (data enc 1).

The first encrypted program instructions (data) 7 (data enc 1) are consequently protected against unauthorized access and can as such be stored or transferred via a network without misgivings.

In the exemplary embodiment, the first encrypted program instructions (data) 7 (data enc 1) are supplied, e.g. transferred via a network, to the CNC control 8, by means of which the program instructions contained in encrypted form in the data are executed for the purpose of machining a workpiece by means of a machine tool (not shown) that is connected to the CNC control.

As a particularity, the CNC control 8 comprises a crypto-coupler 10 which is able, by means of the first decryption key 6, to decrypt the first encrypted program instructions 7 that were encrypted by means of the first encryption key 5, and to re-encrypt the first decrypted program instructions thus generated, immediately following the decryption, by means of a second encryption key 13 (KE2), and thereby to generate second encrypted program instructions (data) 15 (data enc 2). The second encrypted program instructions 15 are advantageously stored in a suitable designated memory (not shown) of the CNC control 8.

The second encrypted program instructions 15 can then be supplied as required to the NCK 9 of the CNC 8 for the purpose of machining a workpiece in accordance with the movement specifications contained in the second encrypted program instructions 15.

In order that the NCK 9 can process the second encrypted program instructions 15, these must however be decrypted first. In order to achieve this, a . . . second decryption key 14 (KD2) is provided by means of which the second encrypted program instructions 15 can be decrypted again, so that second decrypted program instructions 17, and therefore ultimately the program instructions 3 originally generated by means of the PC 1, are available again as "readable" program instructions in unencrypted form, specifically in the form of the second decrypted program instructions 17 (data), and can be processed by the NCK 9.

The second decrypted program instructions 17, which can be processed by the CNC control, therefore match the first decrypted program instructions that were briefly present in the crypto-coupler 10 and the program instructions 3 which were originally generated by means of the CAD/CAM/PP system 2.

In the exemplary embodiment, both the key 4 (K1) that is used on the PC side and the key 12 (K2) that is used on the CNC side are present in the form of key pairs 5, 6 (KE1, KD1) or 13, 14 (KE1, KD1) respectively. Therefore two asymmetrical cryptographic methods are applied, which are known, for example, from encryption and decryption using a "public key" and a "private key".

With regard to the key 4 (K1) and/or the key 12 (K2), it would equally be possible to use a shared key in each case for the encryption and the decryption. This means that the keys 5 and 6 and/or the keys 13 and 14 would be identical. Only one key would therefore exist for encryption and decryption.

In the exemplary embodiment according to FIG. 1, the crypto-coupler 10 comprises an OEM library 11 (OEM Lib) of a user, in which the user of the CNC control 8, e.g. an OEM, can store access permissions for their customers, keys for encryption and/or decryption, such as the first decryption key KD1, and data relating to the algorithms that are used for encryption and decryption. This data is stored in a region outside that region of the NCK 9 of the CNC 8 which is particularly sensitive for the control manufacturer, e.g. in a separate memory (not shown) or at least a separate memory area (not shown).

Moreover, in the exemplary embodiment according to FIG. 1, the NCK 9 comprises a DRM library 16 (DRM) of the control manufacturer, in which the control manufacturer can store access permissions for their customers, keys for encryption and/or decryption, such as the second decryption key KD2, and data relating to the algorithms that are used for encryption and decryption. This data is stored in a region of the NCK 9 of the CNC 8, said region being specifically protected against unauthorized accesses, e.g. a dedicated memory (not shown), or at least in a separate memory area (not shown) of a memory of the NCK 9, said memory area being specifically protected against unauthorized access.

Specifically for a secure transfer of the data (program instructions) 3 between the external PC 1 and the CNC control 8, it is also possible for both partners to "negotiate" a symmetric key which is valid for this encryption alone, without have to communicate said key. Various methods exist for this purpose. The most popular is the ECDH (Elliptic-curve Diffie-Hellman) method. The encryption and decryption can then be performed symmetrically using the temporarily valid key. This approach has the advantages that the symmetric key can be different for each new data transfer between the partners (new part program, new program instruction), while the speed advantage of symmetrical encryption is achieved at the same time. Unlike the illustration in FIG. 1, a key does not then have to be transferred between the PC 1 and the CNC control 8.

Figure 2:
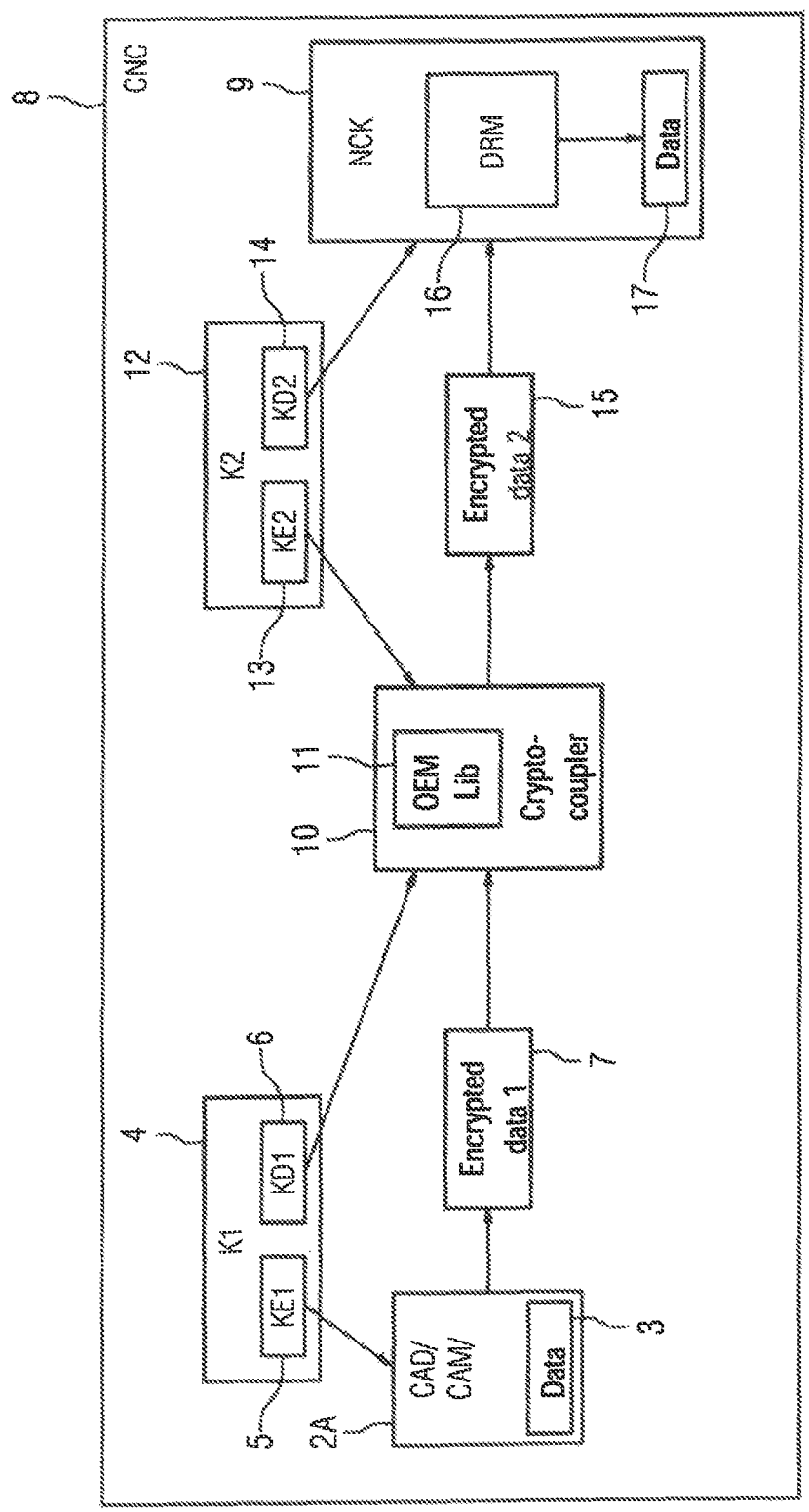
FIG. 2 shows a second embodiment variant of the invention.

In contrast with FIG. 1, the exemplary embodiment according to FIG. 2 shows an embodiment variant of the invention in which a CAD/CAM functionality in the form of a software application 2A (CAD/CAM), which may be composed of a plurality of individual software applications for the different tasks, is contained in the CNC control 8. The program instructions 3 (data) which are required in order to manufacture the workpiece are therefore generated directly on the CNC control 8. In contrast with the exemplary embodiment according to FIG. 1, this also eliminates the need for a post-processor, since the program instructions are generated directly for the actual CNC control 8 and the associated machine tool (not shown).

With the exception of the last cited difference and the omission of data transfers between the PC 1 and the CNC control 8, the remaining procedure in the exemplary embodiment according to FIG. 1—in particular with reference to the encryption and decryption—largely matches the procedure according to FIG. 1, this being reflected in the same reference signs. A detailed description of the individual components and functions is therefore unnecessary.

It should also be noted that the chain from the generation of program instructions 3 by means of the software application 2 or 2A through to the provision thereof as second decrypted program instructions 17 in the NCK can be realized in the form of a continuous data stream, either entirely or at least in sections. This means that the generation, encryption, decryption, re-encryption and re-decryption can take place in the form of individual program instructions or blocks of program instructions. The buffering of complete programs (part programs) is therefore unnecessary.

Alternatively, it is nonetheless also possible at one or more points in the chain to generate and store a complete program file (part program). For example, the second encrypted program instructions 15 (data enc 2) could be generated and buffered first as a complete part program. Only when this part program is available in its entirety (in encrypted form) does the NCK 9 start to process it.

The encrypted part program can be completely decrypted in one step for the purpose of processing, so that all of the program instructions contained in the part program are simultaneously present (in decrypted form) in the form of the second decrypted program instructions 17. The second decrypted program instructions 17 can however also be generated record-by-record or block-by-block from the encrypted part program, and moreover at least essentially in a time period or at a speed which also allows them to be processed by the CNC control 8.

Figure 3:
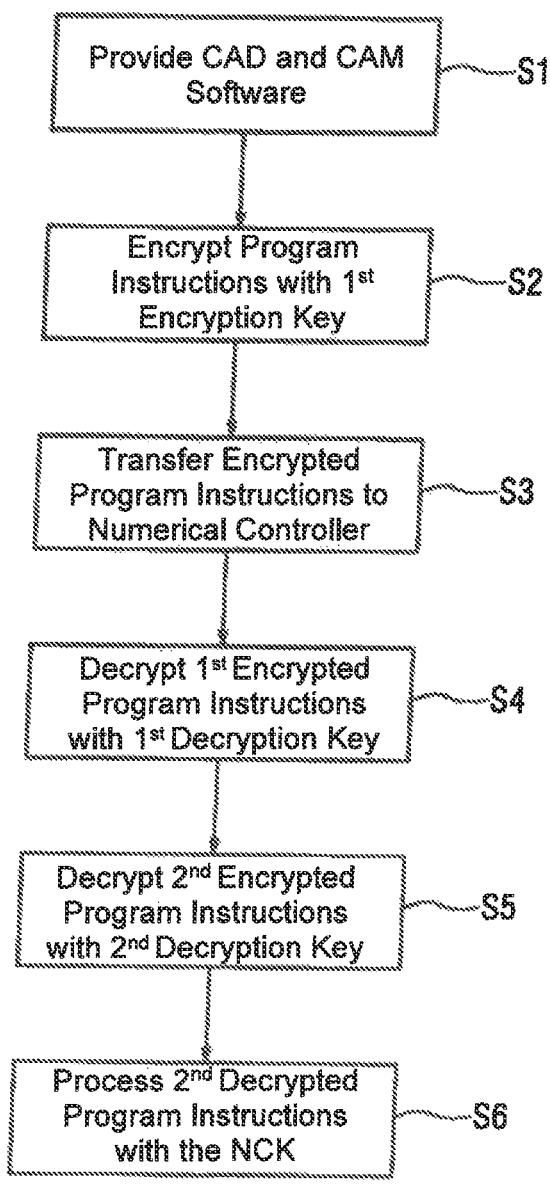
FIG. 3 shows method steps during the performance of a method according to the invention.

FIG. 3 illustrates the main method steps during the performance of a method according to the invention in the form of a sequence diagram.

In a first method step S1. CAD software, CAM software and post-processor software are provided in the event that program instructions for producing a workpiece by means of a production machine are intended to be generated outside a numerical control device, in particular a CNC control, for the purpose of controlling the machine tool. The cited software applications are provided on one or more computers.

In the event that the program instructions are intended to be generated by the numerical control, only CAD software and CAM software are provided on the numerical control device.

Using the CAD software, the CAM software and if applicable the post-processor software, program instructions are generated for the numerical control device as a function of workpiece data relating to the workpiece that is to be produced, said program instructions being suitable for manufacturing the workpiece by means of a production machine which is connected to the numerical control device, in particular a machine tool.

In a second method step S2, the generated program instructions are encrypted by means of a first encryption key and first encrypted program instructions are generated thereby.

In an optional method step S3, the first encrypted program instructions are transferred from an external (relative to the numerical control device) computer onto the numerical control device in the event that the first encrypted program instructions were not generated on the numerical control device.

However, if the first encrypted program instructions were already generated on the numerical control device which is intended for the manufacture of the workpiece, the method step S3 is omitted and method step S2 is followed directly by method step S4.

In a method step S4, the first encrypted program instructions are decrypted by means of a first decryption key and then immediately re-encrypted by means of a second encryption key in order to generate second encrypted program instructions.

In this case, the decryption of the first encrypted program instructions preferably takes place using only a volatile memory of the numerical control device, in particular a memory which cannot be accessed by a user.

A user of the numerical control device, e.g. an OEM, advantageously provides the keys and cryptographic applications that are required for the encryption and decryption of the first encrypted program instructions, in particular in a dedicated OEM library.

In a method step S5, the second encrypted program instructions are decrypted using a second decryption key in order to generate second decrypted program instructions. This operation preferably takes place within an NCK of the numerical control, in particular an NCK which is specially protected against external access.

The manufacturer of the numerical control device advantageously provides the keys and cryptographic applications that are required for the encryption and decryption of the second encrypted program instructions, in particular in a dedicated DRM library.

Finally, the second decrypted program instructions thus present in the NCK are processed by the NCK in a method step S6, whereby in particular a tool of the production machine is moved relative to the workpiece in a manner which is determined by the CAM software.

In summary, the invention has the advantage that any desired encryption mechanisms of the OEM customer can be linked to a numerical control device via the crypto-coupler. Each OEM can therefore define their own methods, formats and keys. These must then be disclosed to the crypto-coupler by the OEM via the OEM library. A link to the numerical control unit is established thereby, and the protection of the program instructions is not compromised.

The invention claimed is:

1. A method for operating a numerical control device for controlling a production machine for producing a workpiece, having the following steps:
    generating program instructions forming individual records or blocks of multiple records of a part program for the production of the workpiece by using CAM (Computer Aided Manufacturing) software or post-processor software downstream of the CAM software in accordance with workpiece data for producing the workpiece with the production machine, with the program instructions generated by encrypting the program instructions with a first encryption key to generate first encrypted program instructions;

decrypting with the numerical control device the first encrypted program instructions with a first decryption key to generate first decrypted program instructions; immediately following decryption, encrypting the first decrypted program instructions with a second encryption key to generate second encrypted program instructions and storing the second encrypted program instructions in a memory of the numerical control device;

reading out the second encrypted program instructions from the memory, decrypting the second encrypted program instructions with a second decryption key record-by-record or block-by-block, such that only those program instructions of the part program which are currently being processed by the numerical control device, or whose processing is imminent, are decrypted to generate second decrypted program instructions; and wherein the second encrypted program instructions are decrypted and made available only in a volatile memory of the numerical control device, wherein the numerical control device, manages access permissions and following a positive check of the access permissions accesses, decrypts and processes the second encrypted program instructions to control the production machine for producing the workpiece.

2. The method of claim 1, further comprising generating, encrypting and transferring the program instructions to the numerical control device with a computing device disposed external to the numerical control device.

3. The method of claim 1, wherein the CAM software is stored in the memory of the numerical control device and is executed by a processor of the numerical control device.

4. The method of claim 1, wherein the first encryption key matches the first decryption key or the second encryption key matches the second decryption key, or both.

5. The method of claim 1, wherein the first encryption key differs from the first decryption key or the second encryption key differs from the second decryption key, or both.

6. The method of claim 1, wherein the second encrypted program instructions are decrypted in an NC kernel of the numerical control device to generate the second decrypted program instructions.

7. The method of claim 1, wherein the second encrypted program instructions are decrypted and made available only in a volatile memory of the numerical control device, in particular a volatile memory of a NC kernel of the numerical control device.

8. The method of claim 1, further comprising restricting decryption of the second encrypted program instructions to at least one of a specific numerical control device, a specific production machine and a specific license.

9. The method as claimed in claim 1, wherein the access permissions are stored in a DRM (Digital Rights Management) library in the numerical control device, or in a NC kernel of the numerical control device.

10. The method of claim 1, wherein the first encryption key and the first decryption key are generated together based on a Diffie-Hellman key exchange.

11. A numerical control device for controlling a production machine for producing a workpiece, wherein the numerical control device is configured as set forth in claim 1.

12. The numerical control device of claim 11, designed as a CNC control.

13. A production machine system, comprising
a numerical control device as set forth in claim 10, and
a production machine controlled with the numerical control device.

14. The production machine system as set forth in claim 13, constructed as a machine tool system which comprises a CNC control and a machine tool.

15. The method of claim 1, wherein the second encrypted program instructions are decrypted and made available in a volatile memory of a NC kernel of the numerical control device.

16. The method of claim 15, wherein the NC kernel manages the access permissions and accesses, decrypts and processes the second encrypted program instructions.

* * * * *